US008887485B2

(12) United States Patent
Ress, Jr.

(10) Patent No.: US 8,887,485 B2
(45) Date of Patent: Nov. 18, 2014

(54) THREE SPOOL GAS TURBINE ENGINE HAVING A CLUTCH AND COMPRESSOR BYPASS

(75) Inventor: Robert A. Ress, Jr., Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1405 days.

(21) Appl. No.: 12/582,339

(22) Filed: Oct. 20, 2009

(65) Prior Publication Data

US 2010/0154383 A1 Jun. 24, 2010

Related U.S. Application Data

(60) Provisional application No. 61/196,765, filed on Oct. 20, 2008.

(51) Int. Cl.
*F02K 3/06* (2006.01)
*F02C 7/36* (2006.01)
*F02K 3/072* (2006.01)

(52) U.S. Cl.
CPC . *F02K 3/072* (2013.01); *F02C 7/36* (2013.01); *F05D 2260/4023* (2013.01)
USPC ......... 60/226.1; 60/39.163; 60/268; 415/123; 415/55.2; 403/1

(58) Field of Classification Search
CPC ......... Y02T 50/671; Y02T 50/67; F02K 3/00; F02K 3/02; F02K 3/025; F02K 3/04; F02K 3/06; F02K 3/062; F02K 3/065; F02K 3/068; F02K 3/072; F01D 1/24; F01D 17/105; F02C 7/36

USPC .............. 60/226.1, 262, 268, 39.162, 39.163, 60/782, 785, 228, 229; 415/122.1, 123, 415/55.2; 403/1
See application file for complete search history.

(56) References Cited

U.S. PATENT DOCUMENTS

| | | | | | |
|---|---|---|---|---|---|
| 2,804,748 | A | * | 9/1957 | Hutchinson | 60/39.27 |
| 3,385,064 | A | * | 5/1968 | Light et al. | 60/226.1 |
| 3,861,139 | A | | 1/1975 | Jones | |
| 3,997,283 | A | * | 12/1976 | Kronogard | 417/405 |
| 4,043,121 | A | | 8/1977 | Thomas et al. | |
| 4,083,181 | A | * | 4/1978 | Adamson | 60/39.52 |
| 4,175,384 | A | * | 11/1979 | Wagenknecht et al. | 60/226.3 |
| 4,409,788 | A | * | 10/1983 | Nash et al. | 60/226.3 |
| 4,446,696 | A | * | 5/1984 | Sargisson et al. | 60/226.3 |
| 4,651,521 | A | * | 3/1987 | Ossi | 60/226.3 |
| 4,827,713 | A | * | 5/1989 | Peterson et al. | 60/226.1 |

(Continued)

OTHER PUBLICATIONS

European Search Report, EP 09252455.2, Jan. 10, 2012, Rolls-Royce North American Technologies Inc.

*Primary Examiner* — Gerald L Sung
*Assistant Examiner* — Michael B Mantyla
(74) *Attorney, Agent, or Firm* — Krieg DeVault LLP

(57) ABSTRACT

An adaptive cycle gas turbine engine is disclosed having a number of features. A fan arrangement is provided having counter-rotating fan stages, one fan stage is operable to be clutched and decoupled from the other stage. A high pressure compressor bypass is also provided. A clutch is provided to at least partially drive an intermediate pressure compressor with a high pressure turbine when the high pressure compressor is bypassed. A partial bypass of the high pressure turbine may be provided.

8 Claims, 3 Drawing Sheets

(56) References Cited

U.S. PATENT DOCUMENTS

| | | | | |
|---|---|---|---|---|
| 5,003,766 A | * | 4/1991 | Paul | 60/39.15 |
| 5,177,954 A | * | 1/1993 | Paul | 60/39.54 |
| 5,261,228 A | * | 11/1993 | Shuba | 60/226.3 |
| 5,341,636 A | * | 8/1994 | Paul | 60/773 |
| 5,349,814 A | * | 9/1994 | Ciokajlo et al. | 60/226.1 |
| 5,357,748 A | | 10/1994 | Khalid | |
| 5,485,717 A | | 1/1996 | Williams | |
| 5,687,563 A | | 11/1997 | Thompson, Jr. | |
| 5,931,636 A | | 8/1999 | Savage et al. | |
| 6,148,605 A | * | 11/2000 | Lardellier | 60/204 |
| 6,477,829 B1 | * | 11/2002 | Hunter et al. | 60/225 |
| 6,622,475 B2 | * | 9/2003 | Brault et al. | 60/226.3 |
| 6,647,708 B2 | | 11/2003 | Bornhoft et al. | |
| 6,701,717 B2 | | 3/2004 | Flatman et al. | |
| 6,742,324 B2 | * | 6/2004 | Bachelder et al. | 60/204 |
| 6,763,654 B2 | | 7/2004 | Orlando et al. | |
| 6,810,656 B2 | * | 11/2004 | Kortum et al. | 60/226.2 |
| 6,895,741 B2 | * | 5/2005 | Rago et al. | 60/226.1 |
| 6,901,739 B2 | * | 6/2005 | Christopherson | 60/226.3 |
| 6,968,701 B2 | | 11/2005 | Glahn et al. | |
| 7,134,271 B2 | | 11/2006 | Baughman et al. | |
| 7,216,475 B2 | * | 5/2007 | Johnson | 60/226.1 |
| 7,225,607 B2 | * | 6/2007 | Trumper et al. | 60/223 |
| 7,243,495 B2 | * | 7/2007 | Whelan et al. | 60/605.2 |
| 7,246,484 B2 | | 7/2007 | Giffin, III et al. | |
| 7,299,621 B2 | | 11/2007 | Bart et al. | |
| 7,647,762 B2 | * | 1/2010 | Uselton | 60/39.511 |
| 7,691,028 B2 | * | 4/2010 | Hattenbach et al. | 477/55 |
| 7,784,260 B2 | * | 8/2010 | Spalton | 60/39.163 |
| 7,788,898 B2 | * | 9/2010 | Kern et al. | 60/204 |
| 7,791,235 B2 | * | 9/2010 | Kern et al. | 310/103 |
| 8,251,639 B2 | * | 8/2012 | Talan | 415/1 |
| 8,256,202 B1 | * | 9/2012 | Paulino | 60/39.17 |
| 2002/0148216 A1 | * | 10/2002 | Brault et al. | 60/226.1 |
| 2005/0081509 A1 | * | 4/2005 | Johnson | 60/226.1 |
| 2005/0198941 A1 | | 9/2005 | Bart et al. | |
| 2005/0226720 A1 | | 10/2005 | Harvey et al. | |
| 2006/0096272 A1 | | 5/2006 | Baughman et al. | |
| 2006/0196164 A1 | | 9/2006 | Donohue | |
| 2007/0000232 A1 | * | 1/2007 | Powell et al. | 60/204 |
| 2007/0119150 A1 | * | 5/2007 | Wood et al. | 60/226.1 |
| 2007/0125065 A1 | | 6/2007 | Renggli et al. | |
| 2007/0130913 A1 | * | 6/2007 | Harrison | 60/226.3 |
| 2007/0186535 A1 | | 8/2007 | Powell et al. | |
| 2008/0098714 A1 | | 5/2008 | Orlando et al. | |
| 2008/0098715 A1 | | 5/2008 | Orlando et al. | |
| 2008/0098717 A1 | * | 5/2008 | Orlando et al. | 60/226.1 |
| 2009/0314003 A1 | * | 12/2009 | Talan | 60/778 |
| 2010/0223903 A1 | * | 9/2010 | Starr | 60/204 |

* cited by examiner

THREE SPOOL GAS TURBINE ENGINE HAVING A CLUTCH AND COMPRESSOR BYPASS

CROSS REFERENCE TO RELATED APPLICATIONS

The present application claims the benefit of U.S. Provisional Patent Application 61/196,765, filed Oct. 20, 2008, and is incorporated herein by reference.

TECHNICAL FIELD

The technical field relates to adaptive cycle gas turbine engines.

BACKGROUND

Gas turbine engines are typically configured for maximum efficiency at a single operating condition or design point. Engines for a civil or military transport aircraft are optimized for subsonic cruise conditions. Engines for a supersonic transport or strike aircraft are optimized for supersonic dash conditions. Operation of the gas turbine at any condition away from the design point seriously compromises performance as cycle parameters such as bypass ratio and pressure ratio are non-optimum. Additionally, fan diameter and core size can be set by takeoff thrust requirements or single engine out conditions. The gas turbine engine can thus be oversized for the design point condition. As a result, fuel burn is compromised at both the design and off design conditions.

It is desirable to have a gas turbine engine which can adapt to a variety of flight conditions and provide desired performance. Accordingly, there remains a need for further contributions in this area of technology.

SUMMARY

One embodiment of the present invention is a unique gas turbine engine. Other embodiments include apparatuses, systems, devices, hardware, methods, and combinations for adaptive cycle gas turbine engines. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
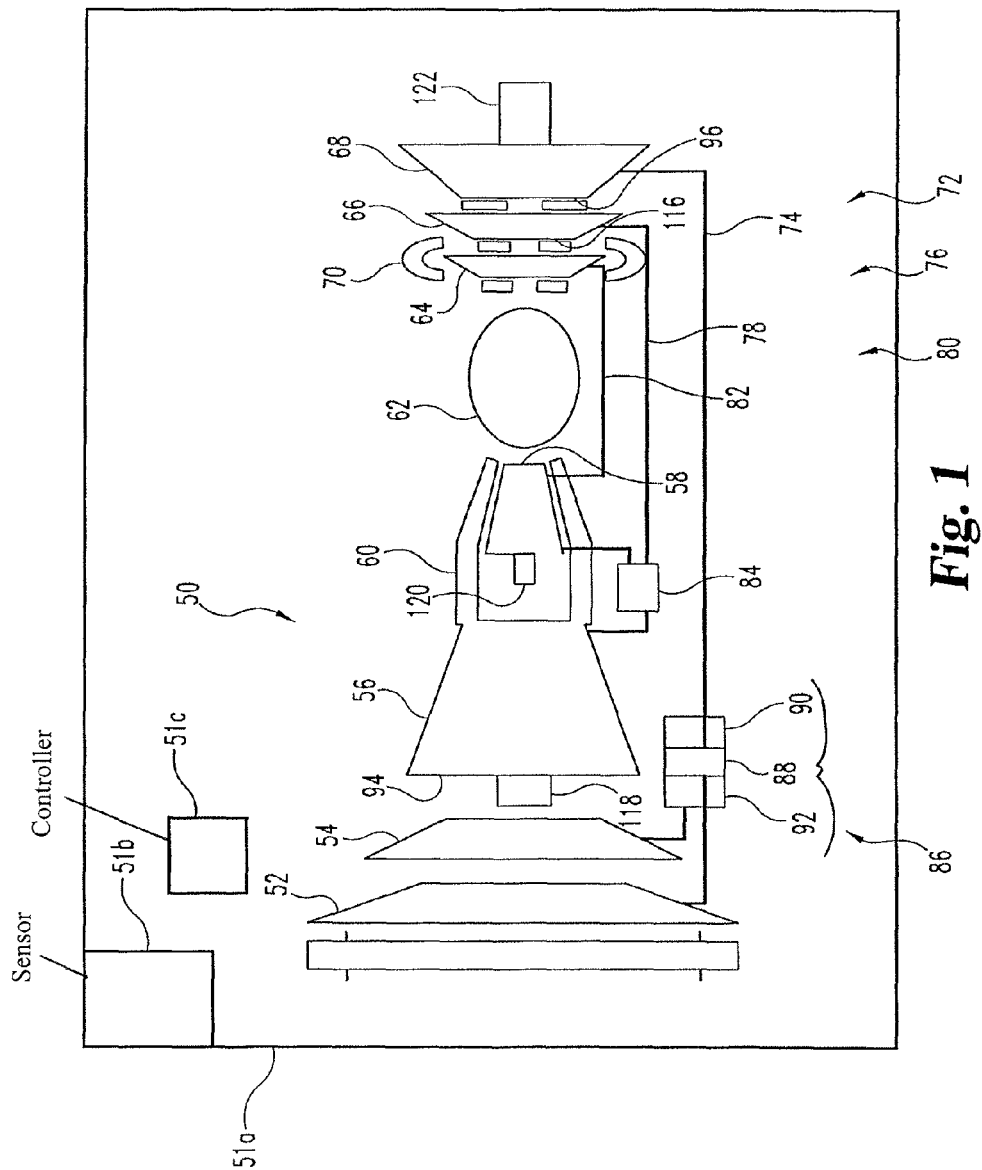
FIG. 1 is a schematic of one form of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Turning to FIG. 1, a schematic is shown of a gas turbine engine 50 coupled to and providing propulsive power to an aircraft 51a that is capable of operating at subsonic and supersonic speeds. As used herein, the term "aircraft" includes, but is not limited to, airplanes, unmanned space vehicles, fixed wing vehicles, variable wing vehicles, unmanned combat aerial vehicles, tailless aircraft, missiles, and other airborne and/or extraterrestrial (spacecraft) vehicles. The aircraft 51a includes a sensor 51b and a controller 51c.

The sensor 51b measures aircraft flight condition such as speed and altitude, to set forth just two non-limiting examples, and may output any variety of data whether sensed or calculated. For example, the sensor 51b may sense and output conditions such as static temperature, static pressure, total temperature, and/or total pressure, among possible others. In addition, the flight condition sensor 51b may output calculated values such as, but not limited to, equivalent airspeed, altitude, and Mach number. Any number of other sensed conditions or calculated values may also be output. The flight condition sensor 51b provides data to the controller 51c and may output values in either analog or digital form.

The controller 51c is typically positioned in an avionics bay of the aircraft 51a and may be a single component, or a collection of operatively coupled components. The controller 51c may be comprised of digital circuitry, analog circuitry, or a hybrid combination of both of these types. Also, the controller 51c may be programmable, an integrated state machine, or a hybrid combination thereof. The controller 51c may include one or more Arithmetic Logic Units (ALUs), Central Processing Units (CPUs), memories, limiters, conditioners, filters, format converters, or the like which are not shown to preserve clarity. In one form, the controller 51c is of a programmable variety that executes algorithms and processes data in accordance with operating logic that is defined by programming instructions (such as software or firmware). Alternatively or additionally, operating logic for the controller 51c can be at least partially defined by hardwired logic or other hardware. In one particular form, the controller 51c is configured to operate as a Full Authority Digital Engine Control (FADEC); however, in other embodiments it may be organized/configured in a different manner as would occur to those skilled in the art.

The gas turbine engine 50 includes a first fan stage 52 followed by a counter-rotating second fan stage 54 that is clutched and geared. The gas turbine engine 50 also includes an intermediate pressure compressor (IPC) 56 and a high pressure compressor (HPC) 58. A high pressure compressor bypass 60 is operable to substantially bypass the HPC 58 and deliver compressed air produced by the IPC 56 to a combustor 62. The gas turbine engine 50 also includes a high pressure turbine (HPT) 64, an intermediate pressure turbine (IPT) 66, and a low pressure turbine (LPT) 68. A high pressure turbine bypass 70 is configured to bypass a portion of a flow from the combustor 62 past the HPT 64.

The gas turbine engine includes three spools. A low pressure spool 72 includes the first fan stage 52, the second fan stage 54, the low pressure turbine 68, and a low pressure shaft 74. An intermediate pressure spool 76 includes the IPC 56, the IPT 66, and an intermediate pressure shaft 78. A high pressure spool 80 includes the HPC 58, the HPT 64, and a high pressure shaft 82.

A clutch assembly 84 allows the HP spool 80 to be linked with the IP spool 76 during the high pressure compressor bypass mode. This allows the HPT 64, which would be otherwise unloaded, to join the IPT 66 in driving the IPC 56. The gas turbine engine 50 in effect becomes a two-spool turbofan with a lightly-loaded two-stage high pressure turbine. A variable intermediate pressure turbine nozzle 116 is utilized to accommodate the differing flow conditions of the IPT 66. FIG. 1 depicts the clutch 84 in a relatively forward area of the gas turbine engine 50 between the HPC 58 and the IPC 56, but other locations are also possible. In one embodiment, the clutch 84 can be located in a relatively aft area between the HPT 64 and the IPT 66, to set forth just one non-limiting example.

The second fan stage 54 is driven off the low pressure shaft 74 through a planetary gear train 88 and a clutch 86. The planetary gear train 88 provides counter-rotation with the first fan stage 52 and the ability to change the rotational speed of the second fan stage 54 relative to the first fan stage 52. A clutch 90 allows the second fan stage 54 to be engaged when high specific thrust is desired such as during takeoff and supersonic dash conditions. The second fan stage 54 is disengaged during subsonic cruise conditions where lower fan pressure ratio and higher bypass ratio are desired. A mechanical lock (not shown) is engaged when the fan stages are synchronized. A second clutch 92 is incorporated to stop second fan rotation when disengaged from the low shaft. A second mechanical lock (not shown) is engaged when rotational speed is brought to zero. The two clutches 90 and 92 are preferably of the wet clutch type so as to eliminate any debris from being generated within the engine as would a dry clutch arrangement. The blading design of the counter-rotating arrangement allows the second fan stage 54 to be stopped with minimal pressure loss as the stationary airfoil acts as a stator vane.

A variable inlet guide vane 94 is utilized at the front of the IPC 56 to deal with the differing flow conditions downstream of the fans 52 or 54. Additionally, a variable inlet guide vane 96 is utilized at the front of the LPT 68 to accommodate the variable loading conditions of the fan system.

Figure 2A:
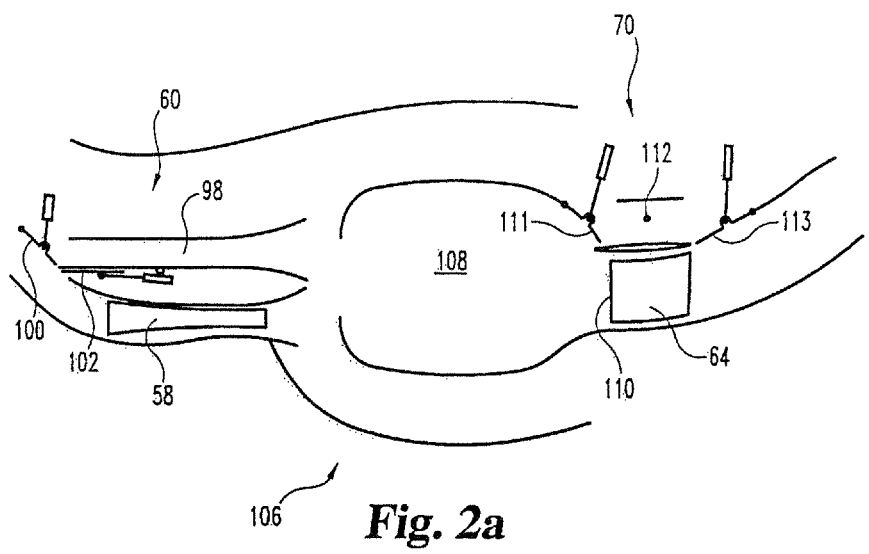
FIG. 2a is a schematic of one form of a compressor and combustor.
Figure 2B:
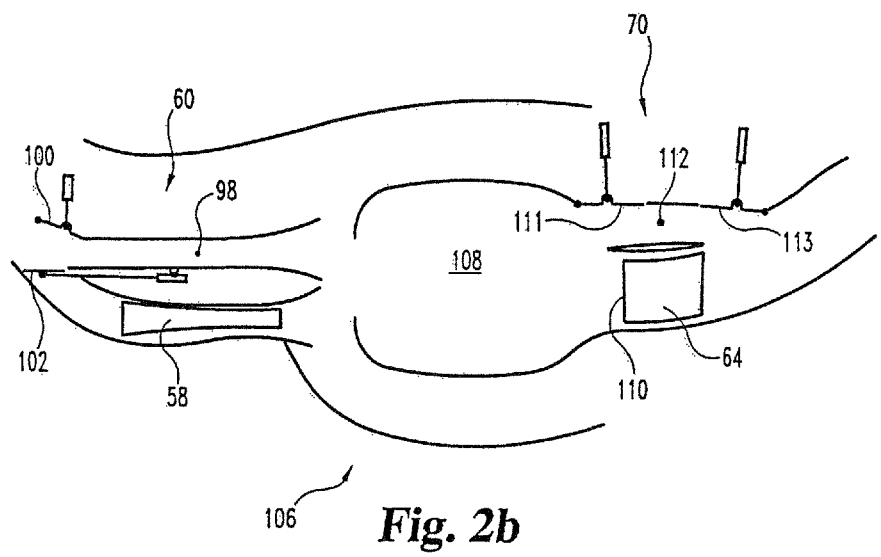
FIG. 2b is a schematic of one form of a compressor and combustor.

Turning now to FIGS. 2*a* and 2*b*, and with continuing reference to FIG. 1, the high pressure compressor bypass 60 allows partial or full bypass of the HPC 58. The high pressure compressor bypass 60 includes a bypass duct 98 with outer doors 100 in the bypass stream and an inner translating cowl 102 in the core stream. Additionally, variable stator vanes are incorporated throughout the high pressure compressor 58. The outer doors 100, the cowl 102, and variable vane positions are synchronized to allow the proper flow condition through the high pressure compressor 58. For takeoff and subsonic cruise conditions where high overall pressure ratio is desired, the high pressure compressor bypass 60 is set to allow full flow through the HPC 58. For the supersonic dash condition where low overall pressure ratio is desired, the high pressure compressor bypass 60 is set to fully bypass the HPC 58. Intermediate positions are also available to allow a smooth transition between extreme settings.

For the adaptive cycle gas turbine engine 50, a combustion system 106 is sized for a supersonic dash condition. Here the combustion system 106 must accept the high corrected flow out of the IPC 56 when the HPC 58 is fully bypassed. As a result, the combustion system 106 is oversized for the subsonic cruise condition where full core compressor flow (i.e., full flow through the HPC 58) is achieved. Dual dome combustors 108 with primary and secondary nozzles (not shown) may be incorporated to tailor the combustion system 106 to specific applications.

The HPT 64 includes a variable geometry entry nozzle 110, a single stage rotating blade row, and a variable bypass duct 112 around the vane and blade row. HPT bypass first door 111 and HPT bypass second door 113 are operated to open and close the variable bypass duct 112. The variable bypass stream is sized to allow partial bypass of the HPT 64 under supersonic dash conditions. Under this condition, the HPC 58 is fully bypassed and the corrected flow from the IPC 56 into the dual dome combustors 108 and subsequently the HPT 64 exceeds the flow capacity of the turbine. The excess flow is bypassed around the HPT 64 and reinjected into the flow path ahead of the IPT 66.

Power units 118, 120, and 122 can be integrated on all three spools to allow power sharing between spools. The power units can be generators or starter-generators. The power units 120 and/or 122 may take the form of a starter/generator integrated into either the HP spool 80 or the IP spool 76. When a starter/generator is incorporated into the IP spool 76, the IP/HP clutch assembly 84 can allow rotation of both spools 80 and 76 for rapid starting. The power unit 122 can be either a centerline front mounted assembly or a tailcone mounted assembly. The tailcone mounted assembly is preferred as the LP clutch 86 and planetary gear train 88 limits the space available for front mounting. The power unit 120 can be either centerline mounted or external core mounted. If external core mounted, a towershaft drive system (not shown) can be introduced. The power unit 120 can be a centerline mounted unit.

The adaptive cycle gas turbine engine 50 can also include variable cooling flow to the HPT 64, cooled cooling flow utilizing both air to air and fuel to air heat exchangers, variable low pressure turbine nozzles to vary the LPT 68 flow capacity, a variable mixer and a fan tip extraction system to minimize inlet spillage drag and for exhaust system cooling flow. Additionally, an intermediate pressure compressor discharge bleed may be incorporated to provide flow for high lift devices for a short takeoff and landing (STOL) application.

In some embodiments, the gas turbine engine 50 may use the high pressure compressor bypass system to provide variable overall pressure ratio capability. In some forms the gas turbine engine 50 may use the partial high pressure turbine bypass to accommodate high mass flow in high pressure compressor bypass mode. In other forms the gas turbine engine 50 may use the high rotor clutch system to link the IP and the HP spools during high pressure compressor bypass mode. In yet further forms, the gas turbine engine 50 may use the low rotor clutch system to provide variable fan pressure ratio and variable bypass ratio. In still other forms the gas turbine engine 50 may use the low rotor gear train to provide counter-rotation of the second fan stage enabling disengagement. In still further forms, the gas turbine engine 50 may use the low rotor gear train to allow the second fan stage to run at increased fan speed relative to the first fan stage. In other forms, the gas turbine engine 50 may use modulated cooling flow to maximize cycle efficiency at off design conditions. In still further forms, the gas turbine engine 50 may use an intermediate pressure compressor discharge bleed to provide flow for high lift devices of STOL applications. In other forms, the gas turbine engine 50 may absorb excess power in spools in generators for spool power sharing and vehicle needs.

Figure 3:
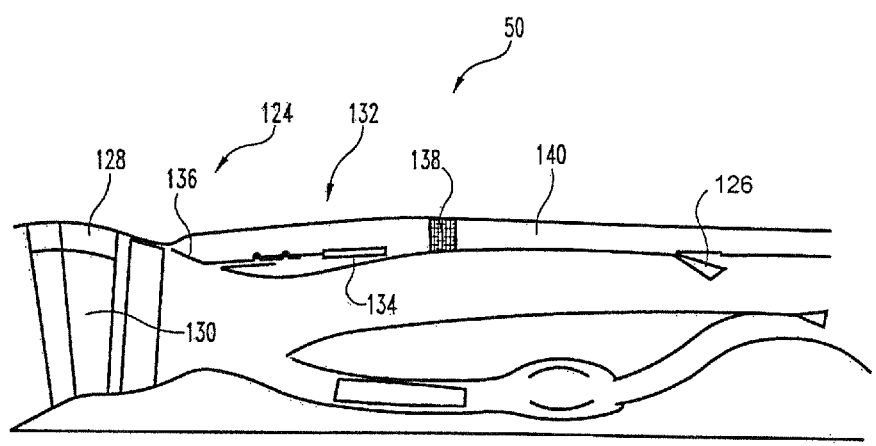
FIG. 3 is a schematic of one form of a gas turbine engine.

FIG. 3 depicts an embodiment of the gas turbine engine 50 having an inlet flow control system 124 and a variable area mixer 126. Any of the above forms/features/variations of the gas turbine engine 50, either alone or in combination, can be used with the flow control system 124 and/or the variable area mixer 126. To set forth just one non-limiting example and with continued reference to FIGS. 1, 2*a*, and 2*b*, the high pressure compressor bypass 60 and the high pressure turbine bypass 70 can be used together with the flow control system 124 and/or the variable area mixer 126. The inlet flow control system 124 includes independently variable tip and main inlet guide vanes (IGV) denoted as 128 and 130, respectively. The inlet flow control system 124 also includes a variable fan bleed 132 that includes an actuator 134 coupled with a variable fan bleed door 136. The actuator 134 can open the variable fan bleed door 136 for inlet flow matching and can close the variable fan bleed door 136 when not needed. A fuel cooler 138 is disposed in a fan bleed duct 140 in the illustrative embodiment.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a gas turbine engine having three spools including a first pressure spool, a second pressure spool, and a third pressure spool;
   a fan having a first fan stage and a second fan stage, the fan rotatingly coupled with a first pressure shaft of the first pressure spool;
   a compressor bypass operable to bypass a compressed air past a third pressure compressor of the third pressure spool, the compressor bypass in fluid communication with a core combustor of the gas turbine engine such that working fluid that flows through the compressor bypass passes directly to and through the core combustor of the gas turbine engine before flowing through a bladed turbine rotor of the gas turbine engine;
   a turbine bypass operable to bypass a portion of a combustion flow past a third pressure turbine of the third pressure spool; and
   a clutch coupling the third pressure turbine to a second pressure shaft of the second pressure spool, wherein work produced from the third pressure turbine is used to rotate a second pressure compressor when the clutch engages the third pressure turbine to the second pressure shaft.

2. The apparatus of claim 1 wherein the first fan stage and the second fan stage are counter-rotatable.

3. The apparatus of claim 1 which further includes a fan clutch operable to selectively engage the second fan stage to the first pressure shaft, wherein the first fan stage is capable of rotating at a different speed relative to the second fan stage.

4. The apparatus of claim 1 wherein the compressor bypass further includes a compressor door operable to permit a compressor flow to bypass a third pressure compressor.

5. The apparatus of claim 1 wherein the compressor bypass further includes a compressor cowl operable to discourage a compressor flow through the third pressure compressor.

6. The apparatus of claim 1 wherein the turbine bypass further includes a turbine door operable to permit a turbine flow to bypass the third pressure turbine.

7. The apparatus of claim 1 which further includes a variable fan bleed having an open condition and a closed condition, the open condition useful for inlet flow matching.

8. The apparatus of claim 7 wherein the variable fan bleed includes a door operable to open a bleed passage when the variable fan bleed is in the open condition.

* * * * *